April 29, 1969 W. B. LLOYD 3,440,825
HYDRAULIC UNDERSEA MANIPULATOR APPARATUS
Filed April 6, 1967
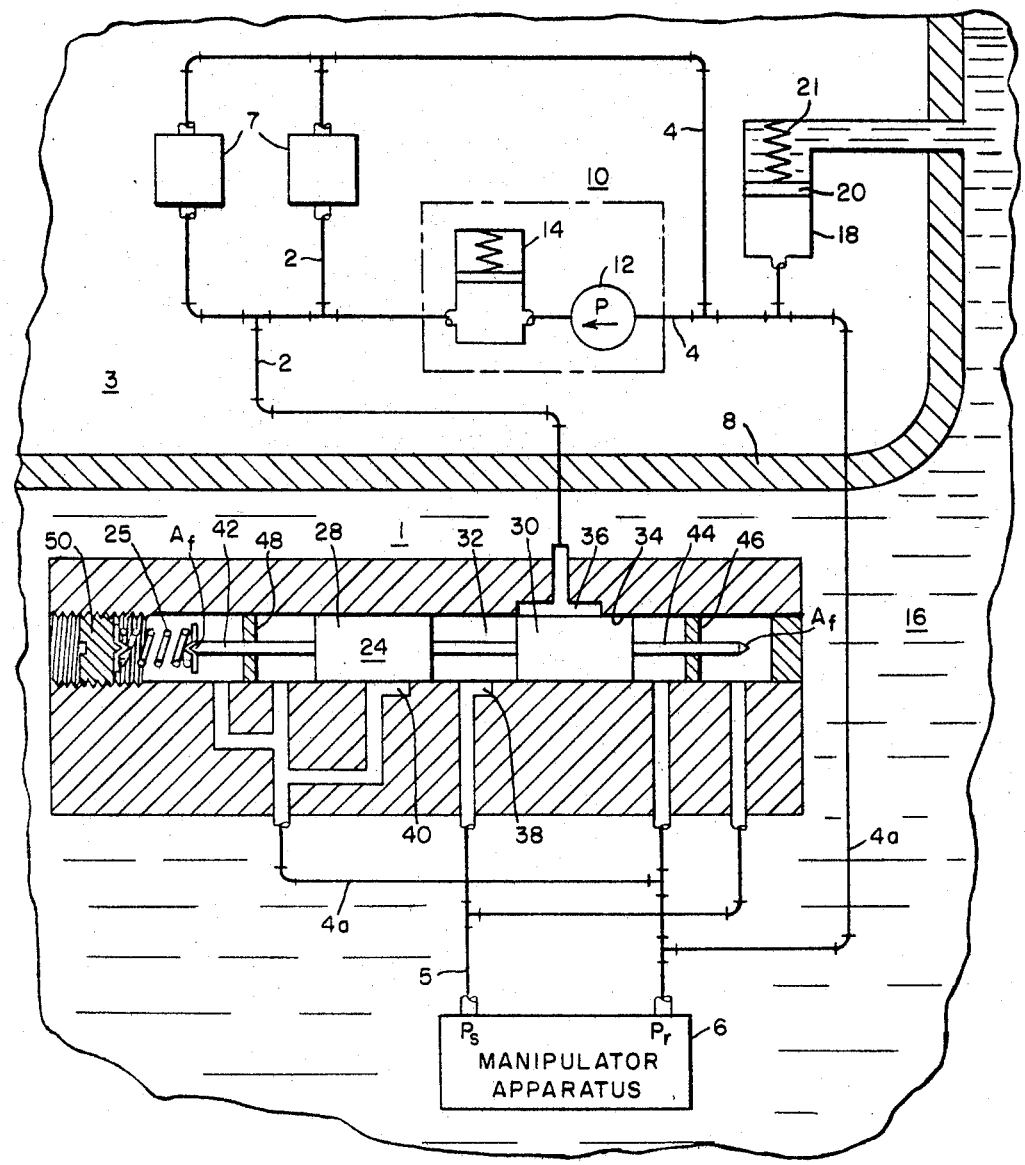
INVENTOR
Wayne B. Lloyd.

United States Patent Office 3,440,825
Patented Apr. 29, 1969

3,440,825
HYDRAULIC UNDERSEA MANIPULATOR APPARATUS
Wayne B. Lloyd, Baltimore, Md., assignor to Westinghouse Electric Corporation, Pittsburgh, Pa., a corporation of Pennsylvania
Filed Apr. 6, 1967, Ser. No. 629,012
Int. Cl. B63c *11/34;* B25j *3/00;* B63g *8/00*
U.S. Cl. 61—69         5 Claims

ABSTRACT OF THE DISCLOSURE

On an undersea vehicle, an external hydraulically-operated manipulator apparatus is provided with operating fluid at a supply pressure which is automatically maintained a fixed differential above a sea-ambient-compensated return pressure, from a main constant-pressure hydraulic supply source on the vehicle through the medium of a regulating valve device comprising a piston valve subject to the force of a bias spring and to the aforesaid return pressure action in a valve-opening direction and to the aforesaid supply pressure (piston valve delivery pressure) acting in a valve-closing direction.

---

The invention herein described was made in the course of a contract with the Department of the Navy.

BACKGROUND OF THE INVENTION

Field of invention

Hydraulic system for undersea manipulator apparatus.

Description of the prior art

In an undersea manipulator apparatus, employing actuator-controlling servo valve devices of the flow-control type which regulate output in terms of rate of flow of fluid, rather than in terms of liquid pressure, it becomes important that the pressure differential across the valve device, i.e., between supply and return pressures, be stabilized in response to such devices to input commands. Since it is common practice to provide a return pressure which is automatically maintained slightly in excess of the ambient sea pressure, which varies with depth, it thus becomes important also to provide a varying supply pressure in order to preserve the desired fixed difference between supply and return pressures. Previously, such supply pressure has been provided by a separate motor-operated pump having its inlet in receipt of the sea-ambient-pressure-compensated hydraulic return, and it is an object of this invention to obviate the need for such particular supply source.

SUMMARY

The present invention employs a fixed-pressure main hydraulic supply source in the undersea vehicle as the hydraulic source of operating fluid for the external flow-control-valve-employing manipulator apparatus by inclusion of a regulating valve device which automatically converts such main supply pressure to a manipulator apparatus supply pressure at a certain degree above the variable sea-ambient-compensated return pressure.

BRIEF DESCRIPTION OF THE DRAWING

The single figure in the drawing is a schematic representation of an illustrative embodiment of the invention.

DESCRIPTION OF THE PREFERRED EMBODIMENT

Referring to the drawing, the present invention comprises a regulating valve device 1, converting a fixed pressure from a main hydraulic supply line 2 in the interior 3 of an undersea vehicle to a supply pressure automatically maintained a certain pressure differential above a sea-ambient-pressure-compensated pressure in a hydraulic return line 4, in availment via a manipulator supply line 5 to a flow-control-valve-employing manipulator apparatus 6 disposed externally of the hull 8 of such undersea vehicle.

The main fixed-pressure supply line 2 in the interior 3 of the undersea vehicle may be at such as 4,500 p.s.i., for example, to provide pressurized operating fluid for numerous hydraulic devices 7 aboard the vehicle via respective branches of such supply line. The fixed-pressure source 10 for the main supply line 2 may comprise a pump 12, in receipt of hydraulic fluid from the sea-ambient-pressure-compensated return line 4, and an accumulator 14 to receive the pump discharge and stabilize the pressure at a substantially fixed value.

The compensation of return pressure in accord with the pressure of the ambient sea 16 at the exterior of the hull 8 is obtained by a compensated-pressure return sump 18 having a movable abutment 20 subject opposingly to ambient sea pressure on its one side and return line pressure on its opposite side. A compression spring 21 on the ambient-sea-pressure side of the abutment 20 assures that return pressure in line 4 will be some degree in excess of sea pressure to prevent any leakage of sea water into the hydraulic system via components exposed thereto.

The flow-control-valve-employing manipulator apparatus 6 may be of the type, for example, as exemplified in United States patent application Ser. No. 596,627, filed Nov. 23, 1966, now Patent No. 3,400,541, and assigned to the assignee of the present application, wherein several pivotal joints of a manipulator arm (not shown) are actuated by respective hydraulically-operated rotary actuators under immediate control of respective electrohydraulic servo valve devices of a type which provides a degree of opening between hydraulic output and supply communications according to an electrical control input signal; hence termed "flow control" servo valve devices.

As exemplified in the drawing, the regulating valve device 1 comprises a piston spool valve 24 subject opposingly to the force of manipulator apparatus supply pressure acting on an area of magnitude $A_f$ at its one end and to the sum of the forces created by a helical compression spring 25 and the sea-ambient-compensated return pressure acting on the same area of magnitude $A_f$ at its opposite end, to effect automatic pressurization of the manipulator supply line 5 a predetermined degree above the sea-ambient-compensated pressure in return line 4 by controlling communication between the main supply line 2 and the manipulator apparatus supply line 5 responsively to changes in such line 5 pressure and/or return line pressure. Supply line 5 pressure will tend to be changed by acceptance of fluid therefrom to the manipulator apparatus during its operation, and return line pressure will be changed by the compensated-pressure return sump 18 according to change in ambient sea pressure during descent and ascent of the vehicle.

The piston spool valve 24 comprises two cylindrical lands 28 and 30 at opposite sides of an annular groove 32 which are in slidable fluid-tight sealing engagement with the wall of a bore 34 and cooperable with a supply port 36 open to main supply line 2 and with a delivery port 38 open to manipulator supply line 5, whereby the degree of communication between the two supply lines is determined by the degree of uncovering of the supply port 36 by the land 30 and occurs via the annular groove 32 between the two lands. A release port 40, normally covered by the land 28 may become uncovered to the annular groove 32 to relieve an excess manipulator supply line 5 pressure during a decrease in the sea-ambient-compensated return line 4 pressure with ascent of the vehicle.

The equal-sized piston areas of magnitude $A_f$ on which the manipulator supply and return line pressures act are formed in the ends of respective rods 42 and 44 attached to and extending coaxially in opposite directions from the ends of the lands 28 and 30, respectively, in slidable sealing engagement through central openings in respective partitions 46 and 48 disposed in the bore 34. The rod 42, in addition to being subjected to return line pressure force, has the force of the spring 25 imposed on the projecting end thereof in assist to such return pressure force. An adjustable screw-threaded plug member 50 closing one end of the bore 34 provides for adjustment in the degree of precompression of the spring, hence the degree that manipulator supply pressure availed to line 5 will exceed return pressure in line 4; the piston areas, $A_f$, on the ends of rods 42 and 44 being of equal magnitude. The volumes within the bore 34 between the partitions 46, 48 and the lands 30, 28 are constantly open to the return line 4 pressure to nullify pressure forces acting on opposite ends of such lands. Use of the smaller diameter rods 42 and 44 to provide the piston areas for the spool valve enables a smaller-sized spring 25 to be employed than would be necessary were the ends of the larger-diameter lands 28 and 30 used as piston areas.

In operation of the system, the fixed supply pressure in main hydraulic supply line may be 4,500 p.s.i. (absolute), for example, and the spring 25 in regulator valve device 1 may be precompressed by the screw-threaded plug member 50 to impose a force on one end of the spool valve equivalent to such as 3,000 p.s.i., for example, in addition to the sea-ambient-compensated return pressure, which total force will be balanced by the opposing manipulator supply pressure at the opposite ends of the spool at 3,000 p.s.i. above such return pressure, in accord with the exemplified pressure conditions. The rate at which hydraulic fluid is demanded by the manipulator apparatus via line 5 affects the rate at which main supply line fluid from line 2 must be fed thereto to maintain the desired pressure differential between such line 5 and return line 4. The regulator valve device 1 responds to such variable manipulator demand conditions by compensatory varying degrees of spool travel with corresponding degrees of uncovering of the supply port 36 by the land 30. The pressure differential maintained by the regulator valve device 1 between the manipulator supply and return lines 5 and 4 can be expressed by the equation $P_{5-4} = K_s \cdot X / A_f - K_q$, where $K_s$ is the pickup constant of the spring 25 in pounds per inch, X is the amount that spring 25 is precompressed by the screw plug 50 in inches, $A_f$ is the cross-sectional feedback area of the rod pistons 42 and 44 in square inches, K is the load regulation slope in pound seconds per inch to the fifth power, and $q$ is flow in cubic inches per second.

What is claimed is:
1. Hydraulic apparatus on an undersea vehicle, having:
  a main hydraulic source 10 feeding hydraulic fluid at a substantially constant pressure to a main supply line 2 having branches for distribution to hydraulically-operated devices 7 within the pressure hull 8 of such vehicle,
  a main hydraulic return for such source 10 including a return sump 18 in which pressure is maintained automatically at a pressure in slight excess of ambient sea pressure outside the pressure hull 8, and a main return line 4 open to said return sump 18 and receipt of hydraulic return from the aforesaid hydraulically-operated devices 7,
  a manipulator apparatus 6 disposed externally of the pressure hull 8 of a type employing flow-control servo valve devices and having a manipulator supply line 5 via which pressurized hydraulic fluid is availed to such apparatus and a manipulator return line 4a via which such fluid is released from such apparatus, wherein the improvement comprises,
  a connection of the manipulator return line 4a with the main return line 4 in the vehicle, and inclusion of a pressure regulating valve device 1 controlled responsively to the sea-ambient-compensated pressure existing in the return line 4, 4a to maintain a pressure in the manipulator supply line 5 a selected degree above such return line pressure by regulation of admission of hydraulic fluid from the main supply line 2 to such manipulator supply line.

2. The apparatus of claim 1, wherein the pressure regulating valve device 1 comprises:
  a bias spring 25, and
  a piston spool valve 24 subject to said bias spring 25 and to pressure in said return line 4a acting axially in one direction and to pressure in said manipulator supply line 5 acting in the opposite direction, slidable axially for cooperation with a supply port 36 open to said main supply line 2 to establish a degree of opening (via 32, 38) between said main supply line 2 and the manipulator supply line 5 according to the degree of preponderance in force at the spring 25 and return pressure over the force of the manipulator supply pressure.

3. The apparatus of claim 2, wherein the piston spool valve comprises cylindrical land means 28, 30 and equal-sized end piston areas $A_f$ subject to the manipulator supply and return pressures formed on the ends of projecting coaxial rod-shaped elements 42, 44 of considerably less diameter than that of the land means.

4. The apparatus of claim 3, wherein the bias spring 25 is in the form of a helical compression spring arranged coaxially with one 42 of said rod-shaped elements and coupled at its one end to the projecting end of such element.

5. The apparatus of claim 4, wherein a screw-threaded element 50 provides support for the opposite end of the helical compression spring 25, whereby degree of precompression of such spring may be adjusted.

References Cited
UNITED STATES PATENTS

| | | | |
|---|---|---|---|
| 3,101,976 | 8/1963 | Knowles | 60—52 X |
| 3,168,203 | 2/1965 | Gallistel | 214—1 |
| 3,248,913 | 5/1966 | Brundage | 60—52 X |
| 3,381,485 | 5/1968 | Crooks et al. | 61—69 |

FOREIGN PATENTS 495,169　8/1953　Canada.

DAVID J. WILLIAMOWSKY, *Primary Examiner.*

J. KARL BELL, *Assistant Examiner.*

U.S. Cl. X.R.

60—52; 214—1; 114—16